US009384251B2

(12) United States Patent
Miller-Cushon et al.

(10) Patent No.: US 9,384,251 B2
(45) Date of Patent: Jul. 5, 2016

(54) SYNCHRONIZATION OF OFF-LINE REPORTS AND OFF-LINE MOBILE CONTENT PACKAGES

(75) Inventors: James D. Miller-Cushon, Merrickville (CA); Emilie Noel, Nepean (CA); Murray J. Reid, Carleton Place (CA); Qing Wei, Ottawa (CA); Stewart J. Winter, Metcalfe (CA)

(73) Assignee: International Business Machines Corporation, Armonk, NY (US)

( * ) Notice: Subject to any disclaimer, the term of this patent is extended or adjusted under 35 U.S.C. 154(b) by 651 days.

(21) Appl. No.: 13/444,577

(22) Filed: Apr. 11, 2012

(65) Prior Publication Data
US 2013/0275866 A1    Oct. 17, 2013

(51) Int. Cl.
  G06F 17/30    (2006.01)
  G06F 17/22    (2006.01)
(52) U.S. Cl.
  CPC ...... *G06F 17/30575* (2013.01); *G06F 17/2235* (2013.01); *G06F 17/30374* (2013.01)
(58) Field of Classification Search
  CPC ......... G06F 7/24; G06F 7/21; G06F 7/30905; G06F 3/0488; G06F 3/04883
  USPC ...................................................... 715/273
  See application file for complete search history.

(56) References Cited

U.S. PATENT DOCUMENTS

| 6,931,439 | B1 | 8/2005 | Hanmann et al. |
| 7,272,782 | B2 | 9/2007 | Sneh |
| 7,688,322 | B2 | 3/2010 | Kapler et al. |
| 2005/0091340 | A1* | 4/2005 | Facemire et al. ............. 709/218 |
| 2011/0185305 | A1 | 7/2011 | Lai et al. |
| 2012/0102396 | A1* | 4/2012 | Arksey et al. ................ 715/273 |
| 2012/0323702 | A1* | 12/2012 | Puentes et al. ............. 705/14.71 |

(Continued)

OTHER PUBLICATIONS

Chen, K., K. Heimerl, T. Parikh, C. Robson, and B. Trushkowsky, "Transforming Community-based Healthcare with CommScape", [Online], EECS Department, UC—Berkeley, Technical Report No. UCB/EECS-2009-155, Nov. 5, 2009, retrieved from the Internet at <URL: http://people.ischool.berkeley.edu/~parikh/papers/commscape.pdf>, 6 pp.

(Continued)

Primary Examiner — Scott Baderman
Assistant Examiner — Seung Jung
(74) Attorney, Agent, or Firm — Janaki K. Davda; Konrad, Raynes, Davda and Victor LLP

(57) ABSTRACT

Provided are techniques for presenting a data visualization on an off-line mobile device. A report specification is parsed to detect a drill definition to navigate from a report viewer to an interactive visualizer. Data package report specifications are generated to create data and metadata. Data package report output is obtained for each of the data package report specifications. Data and metadata in each data package report output are converted. The converted data and metadata are stored into a data package. A mobile content package is created using the data package and a visualization specification. A report and the mobile content package are delivered to the off-line mobile device. The report viewer is used to present the report. In response to a user interacting with a user interface control on the presented report, the interactive visualizer is launched to present the data visualization using the mobile content package.

18 Claims, 14 Drawing Sheets

(56) References Cited

U.S. PATENT DOCUMENTS

2013/0238975 A1* 9/2013 Chan et al. .................. 715/234
2014/0012949 A1* 1/2014 Meyers et al. ............... 709/217

OTHER PUBLICATIONS

Chiang, A., "Data Visualization on Smart Phones", [online], Feb. 18, 2011, (retrieved on Sep. 21, 2011), retrieved from the Internet at <URL: http://www.dashboardinsight.com/articles/digital-dashboards/fundamentals/data-visualization-on-smart-phones.aspx> 5 pp.

Kawamoto, M. and T. Itoh, "A Visualization Technique for Access Patterns and Link Structures of Web Sites", [Online], In the Proceedings of the 2010 14th International Conference on Information Visualization, Jul. 2010, retrieved from the Internet at <URL: http://itolab.is.ocha.ac.jp/~itot/paper/ItotRICPE55.pdf>, 6 pp.

Maniatis, A.S., "The Case for Mobile OLAP", [online], In the Proceedings of the 2004 International Conference on Current Trends in Database Technology, Mar. 2004, retrieved from the Internet at <URL: http://www.dblab.ntua.gr/pubs/uploads/TR-2004-11.pdf>, 10 pp.

* cited by examiner

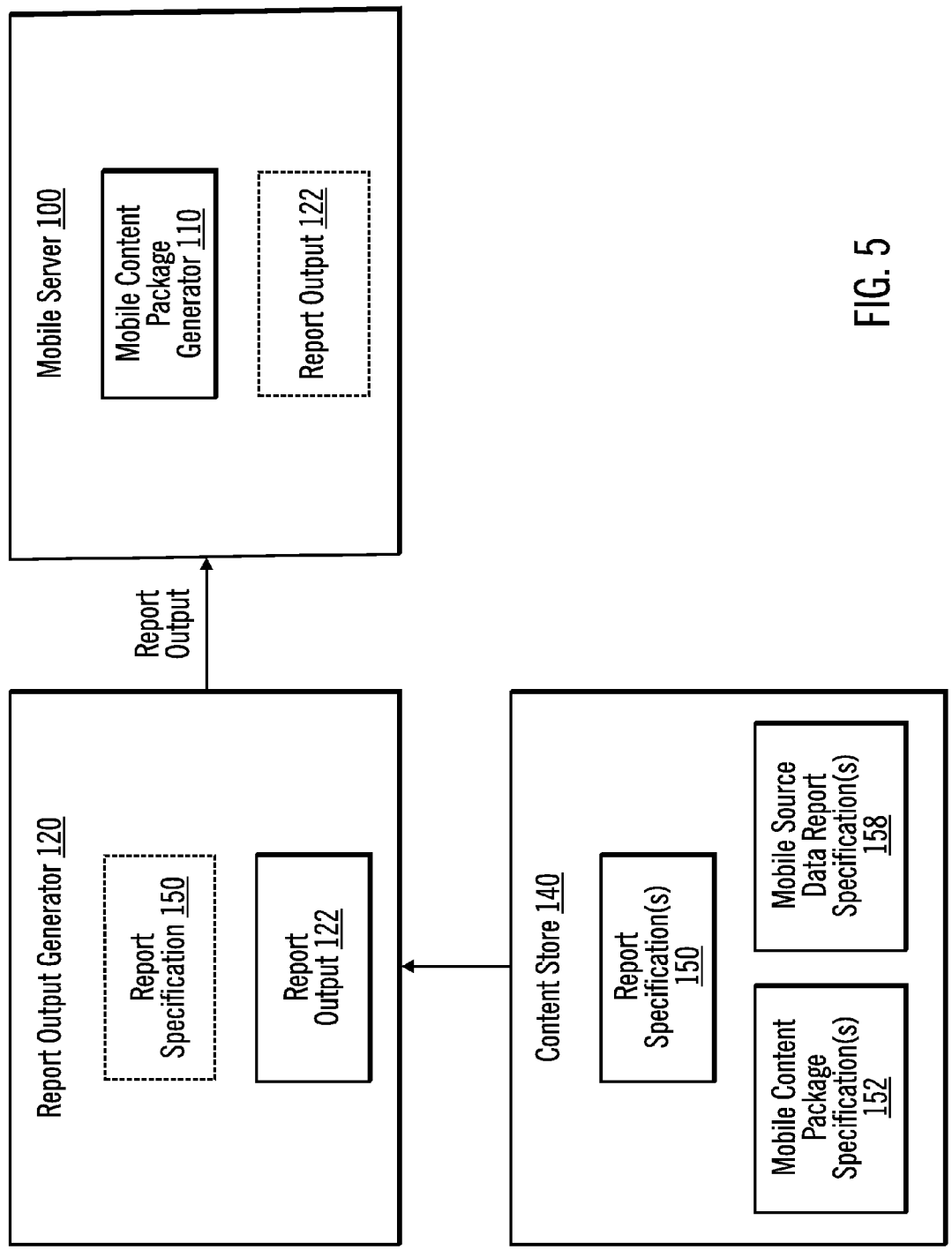

SYNCHRONIZATION OF OFF-LINE REPORTS AND OFF-LINE MOBILE CONTENT PACKAGES

FIELD

Embodiments of the invention relate to synchronization of off-line reports and off-line mobile content packages for data and metadata consistency.

BACKGROUND

Data synchronization appears in many areas. For example, databases may synchronize with each other to maintain copies of information. As another example, a website may be downloaded by following all links of the website to create a complete off-line application. The new generation of tablet devices are unique in that they have both the processing power to process data stored in a local database and have been built from the ground up to support browsing the internet. As such, a new domain of application is emerging in which the application spans a combination of web pages (web content) and data visualization applications that process data stored locally on the tablet. A data visualization application may be described as an application that provides graphical representations of numeric and text data (e.g., a graph, chart, cross tabulations, etc.). When working in an application that is combined in this way, it is useful to the user to have consistent data and metadata in all presentations of the data.

Some conventional systems put all the data necessary for both views on a single device (in this case the tablet), and, in addition to using the data for the data visualization, use the data to generate the web page view. However, the web page view may be drawn from a larger set of data (too large to place on the tablet) and the size of a generalized web page generation program (such as a report output generator or a report server) may be too large for the tablet device technology.

Some conventional systems provide metadata for both the off-line web page and the off-line database. This metadata includes information, such as timestamps, that the user may use to manually enforce a refresh of data as needed.

Some conventional systems manually schedule the creation of each piece of related data on the server side, which would necessitate the manual management of the separate related data pieces on the server side by the report author or an administrator.

Some conventional systems restrict the product to one domain of information storage using only a family of web pages produced on the server and cached locally.

Some conventional systems use a combination of these strategies.

SUMMARY

Provided are a computer implemented method, computer program product, and system for presenting a data visualization on an off-line mobile device. A report specification is parsed to detect a drill definition to navigate from a report viewer to an interactive visualizer. Data package report specifications are generated to create data and metadata for use by the interactive visualizer. Data package report output is obtained for each of the data package report specifications. Data and metadata in each data package report output are converted to a form to be used by the interactive visualizer. The converted data and metadata are stored into a data package. A mobile content package is created using the data package and a visualization specification. A report and the mobile content package are delivered to the off-line mobile device. The report viewer is used to present the report. In response to a user interacting with a user interface control on the presented report, the interactive visualizer is launched to present the data visualization using the mobile content package.

BRIEF DESCRIPTION OF THE SEVERAL VIEWS OF THE DRAWINGS

In the drawings, like reference numbers represent corresponding parts throughout.

FIG. 4 is formed by FIGS. 4A, 4B, 4C, and 4D.

FIG. 5 illustrates, in a block diagram, a mobile content package generator requesting report output from a report output generator and receiving the report output from a report output generator in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments keep multiple related data views synchronized for a consistent off-line experience on a mobile device where the data spans the joint domains of a report output as represented by a web page and a set of data (e.g., represented as a database) extracted from the same source data as the report output.

Figure 1:
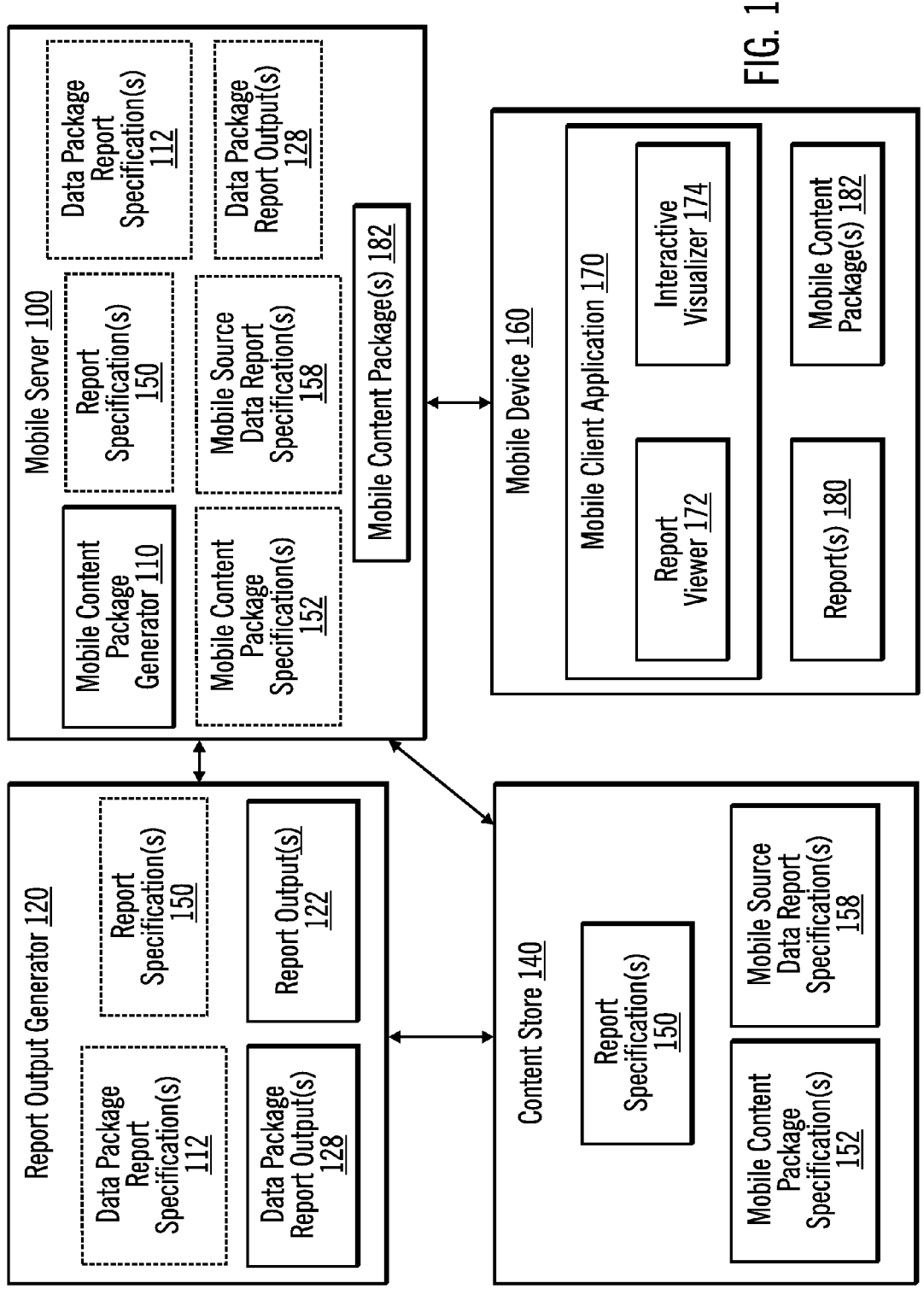
FIG. 1 illustrates, in a block diagram, a computing environment in accordance with certain embodiments.

FIG. 1 illustrates, in a block diagram, a computing environment in accordance with certain embodiments. A mobile server 100 is coupled to a report output generator 120, to a content store 140, and to a mobile device 160. The report output generator 120 is coupled to the content store 140.

The content store 140 stores one or more report specifications 150, one or more mobile content package specifications 152, and one or more mobile source data report specifications 158. The mobile server 100 includes a mobile content package generator 110, and the mobile content package generator 110 may request and store copies of the one or more report specifications 150, the one or more mobile content package specifications 152, and the one or more mobile source data report specifications 158. The report output generator 120 generates report output 122. In addition, the mobile content package generator 110 may generate one or more data package report specifications 112, and the report output generator 120 may create one or more data package report outputs 128 from the one or more data package report specifications 112. In certain embodiments, the generated data package report specifications 112 are based on the mobile source data report specifications 158.

The mobile device 160 may be, for example, a tablet computer or a mobile phone. The mobile device 160 includes a mobile client application 170, one or more reports 180, and one or more mobile content packages 182.

The mobile client application 170 includes one or more viewers. Each of the viewers allows users to interact with data (e.g., by selecting pages, zooming, changing a level of data of the data, navigating through the data, etc.). In certain embodiments, the viewers include a report viewer 172 and an interactive visualizer 174. The report viewer 172 is used to present a report 180. In certain embodiments, the report 180 is presented in Hypertext Markup Language (HTML) within a web browser plug-in. The interactive visualizer 174 presents data visualizations from the mobile content package 182. The viewers allow a user to navigate between viewers. For example, a user may navigate from the report viewer 172 to the interactive visualizer 174 and vice versa.

The mobile server 100 serves as a central delivery server to coordinate delivery of information (e.g., a web page) from the report output generator 120 (or any information generating service) to the mobile device 160.

The report specification 150 may be described as a parseable specification that defines the information to be presented in a viewer (e.g., as a web page).

The mobile client application 170 interacts with the mobile server 100 and presents off-line both reports (e.g., web pages) and data visualizations based on data stored locally on the mobile device 160. In certain embodiments, off-line may be described as the reports and data visualizations being accessed without the mobile device 160 being connected to a network (e.g., the internet). That is the mobile device 160 is off-line. In addition, the mobile client application 170 intercepts any Uniform Resource Locator (URL) links used by the user in the report viewer 172 and then decides on a course of action (such as navigating to the interactive visualizer 174, drilling through to another report or accessing other services on the mobile device 160 (e.g., electronic mail, etc.)).

In the report specification 150, the specification author may define the ability to navigate from one viewer (e.g., a web browser) to another viewer (i.e., a separate data visualization environment). The report specification 150 allows a navigation path to another viewer to be defined in an abstract way and for data from a report 180 (e.g., web page) to be identified as parameters to the other viewer.

Figure 2:
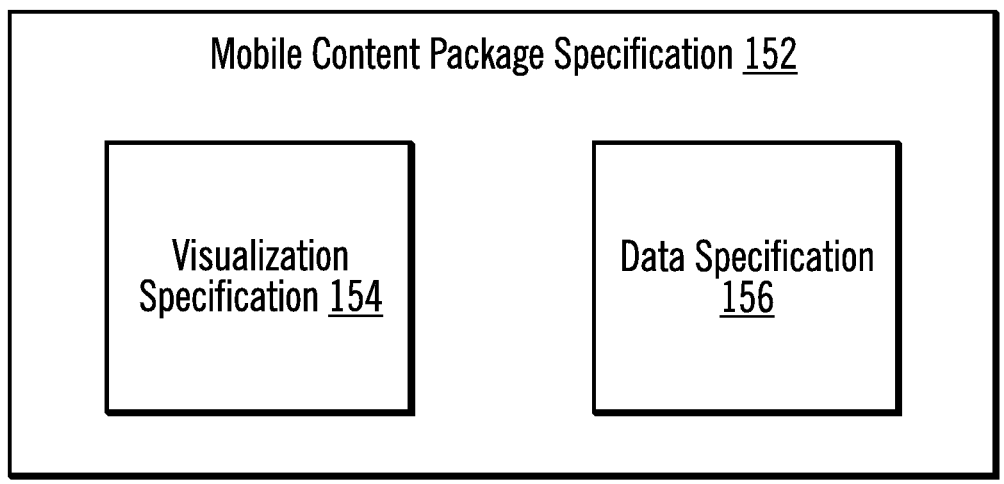
FIG. 2 illustrates, in a block diagram, further details of a mobile content package specification in accordance with certain embodiments.

A mobile content package specification 152 includes metadata that specifies the relationships within the data described by the mobile source data report specification 158. Furthermore, the mobile content package specification 152 specifies properties of the data described by the mobile source data report specification 158. In certain embodiments, the properties may describe that a column of data represents time and can be laid out in a sequence by the interactive visualizer 174, whether a column represents a category or a continuous measure, etc. In certain embodiments, the relationships may describe parent-child relationships or level of detail to allow the interactive visualizer 174 to drill up and drill down. The mobile content package specification 152 may be described as a specification for the target analytical data visualization. FIG. 2 illustrates, in a block diagram, further details of the mobile content package specification 152 in accordance with certain embodiments. The mobile content package specification 152 includes a visualization specification 154 and a data specification 156. The visualization specification 154 describes visualization properties (e.g., user interface options, default presentation layout, etc.). The data specification 156 describes the relationships inside the data (e.g., that a column of data represents time and can be laid out in a sequence by the interactive visualizer 174, whether a column represents a category or a continuous measure, etc.).

The mobile source data report specification 158 defines the data to be deployed to the mobile device 160 where this data is optimized for the data visualization that the data will serve. For example, the optimization may be for both speed and size. The mobile content package specification 152 may identify parameters that are to be supplied from the report 180 (e.g., a web page).

The mobile content package generator 110 parses the report specification 150 and finds one or more mobile content package specifications 152 identified in the report specification 150. The mobile content package generator 110 then retrieves the mobile source data report specification 158 based on the mobile content package specification 152. Then, the mobile content package generator 110 generates the data package report specifications 112. The mobile content package generator 110 sends the data package report specifications 112 to the report output generator 120. The report output generator 120 executes the data package report specifications 112 to create data package report outputs 128. The mobile content package generator 110 converts the data package report outputs 128 from the report output generator 120 into a data package 186 optimized for the data visualization to be viewed on the mobile device 160.

The mobile content package generator 110 parses the report specification 150 to convert the drill through elements to URL links that the mobile client application 170 interpret as links to the interactive visualizer 174.

Figure 3:
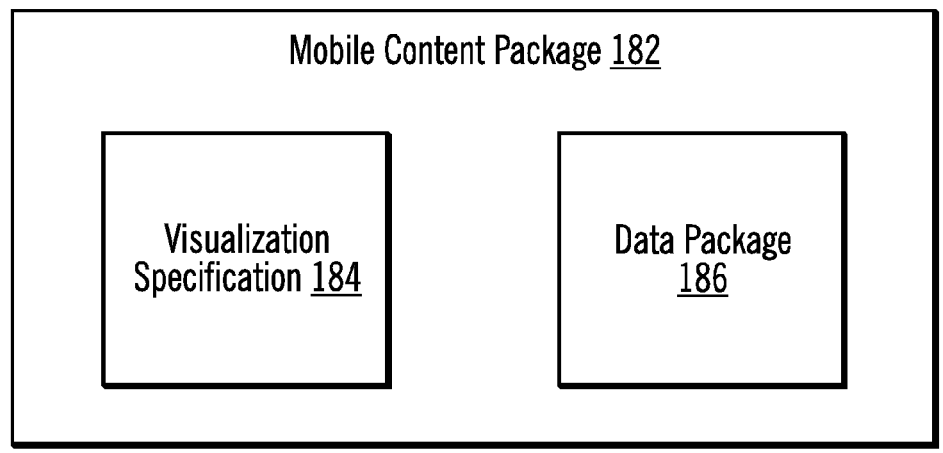
FIG. 3 illustrates, in a block diagram, further details of a mobile content package in accordance with certain embodiments.

The mobile content package 182 is generated based on the visualization specification 154 and the data specification 156 in the mobile content package specification 152. FIG. 3 illustrates, in a block diagram, further details of the mobile content package 182 in accordance with certain embodiments. The mobile content package 182 includes a visualization specification 184 (which is a copy of the visualization specification 154 from the mobile content package specification 152) and the data package 186. The data package 186 contains data and metadata that may be used by the interactive visualizer 174 to present that data. In certain embodiments, the data package 186 is a database.

Embodiments allow for linking web page technology to data visualization technology off-line on the mobile device 160. Embodiments allow the viewers 172, 174 to be working from data that is consistent in that it is drawn from the same data source using the same report output generator 120 from the same time period. Embodiments perform this function of drawing data from the same report output generator 120 automatically without the intervention of the end user or a system administrator. Also, with embodiments, the resulting report 180 and mobile content package 182 are based on common metadata and data. This means that sophisticated data information, such as aggregation, is presented consistently across the two viewers 172, 174.

FIG. 4 illustrates, in a flow diagram, operations for off-line data visualization on a mobile device in accordance with certain embodiments. FIG. 4 is formed by FIGS. 4A, 4B, 4C, and 4D. Control begins at block 400 with a report specification 150, a mobile content package specification 152, and a mobile source data report specification 158 being stored in the content store 140. In certain embodiments, an author creates the report specification 150 that contains drill information to enable navigating between viewers. The author also creates the mobile content package specification 152 that describes the data model to be used by the consuming interactive visualizer 174 and information about the data visualization. The author creates the mobile source data report specification 158 that describes the data to be deployed to the mobile device 160 where this data is optimized for the data visualization that the data will serve.

In block 402, the report output generator 120 executes the stored report specification 150 (from block 400) to create report output 122. In certain embodiments, an end user runs the report specification 150 that was created. In certain alternative embodiments, the report specification 150 executes as part of a report schedule.

In block 404, the mobile content package generator 110 receives the report output 122 from the report output generator 120. FIG. 5 illustrates, in a block diagram, the mobile content package generator 110 requesting the report output 122 from the report output generator 120 and receiving the report output 122 from the report output generator 120 in accordance with certain embodiments.

Figure 6:
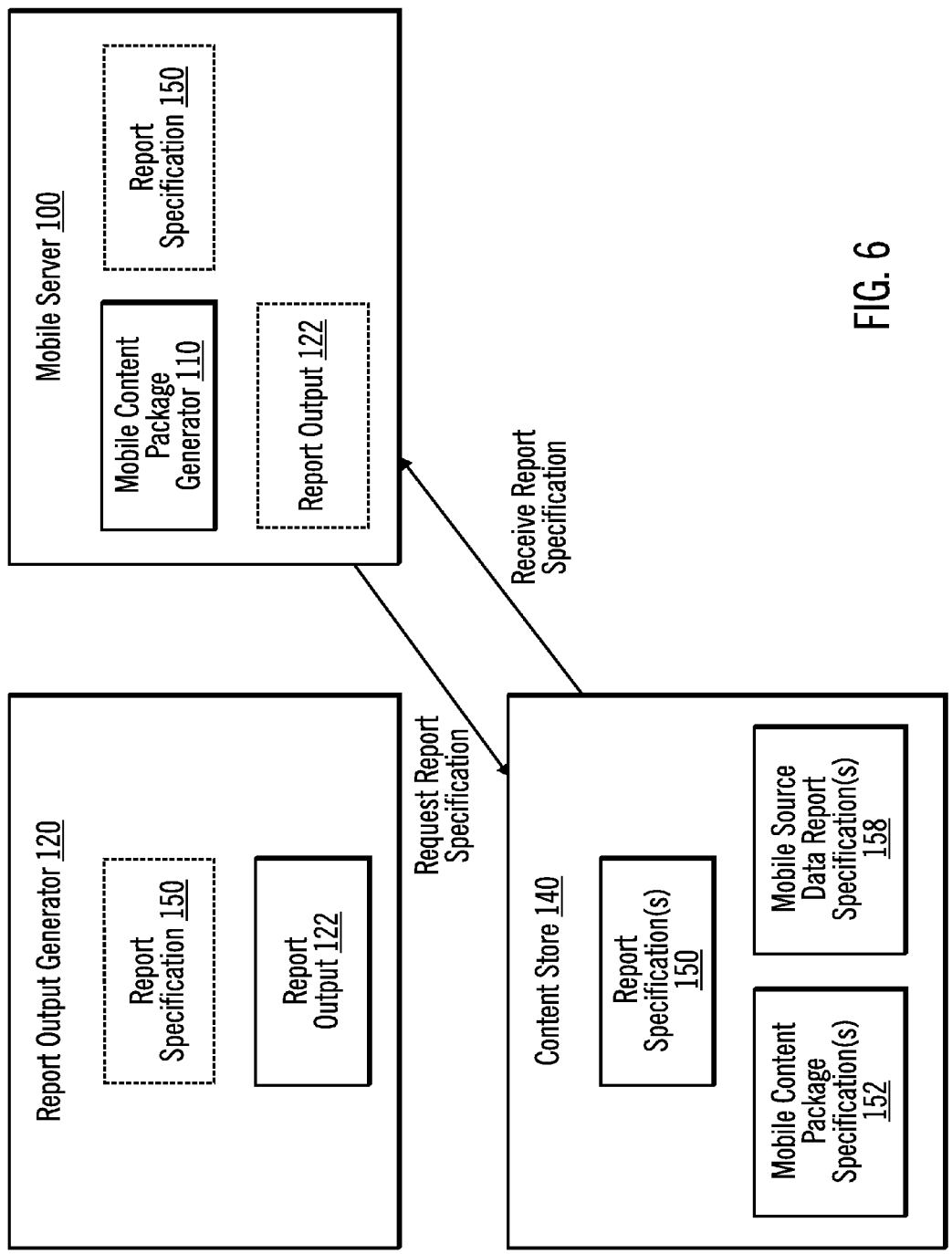
FIG. 6 illustrates, in a block diagram, a mobile content package generator requesting a report specification from a content store and receiving the report specification from the content store in accordance with certain embodiments.

In block 406, the mobile content package generator 110 retrieves a report specification 150. In certain embodiments, the mobile content package generator 110 retrieves the report specification 150 from the report output 122. In certain alternative embodiments, the mobile content package generator 110 retrieves the report specification 150 from the content store 140. FIG. 6 illustrates, in a block diagram, the mobile content package generator 110 requesting the report specification 150 from the content store 140 and receiving the report specification 150 from the content store 140 in accordance with certain embodiments.

Figure 4A:
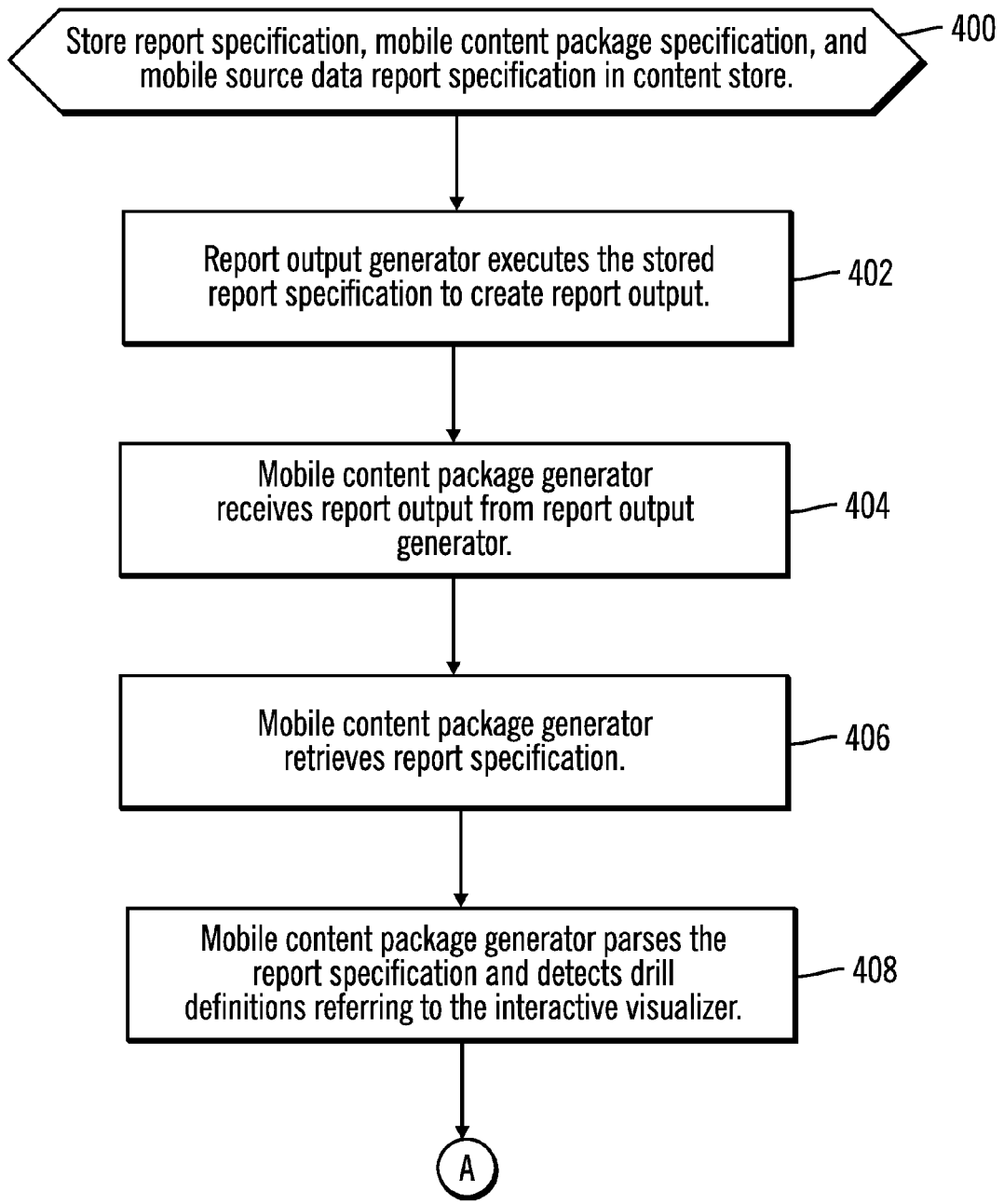
FIG. 4 illustrates, in a flow diagram, operations for off-line data visualization on a mobile device in accordance with certain embodiments.
Figure 4B:
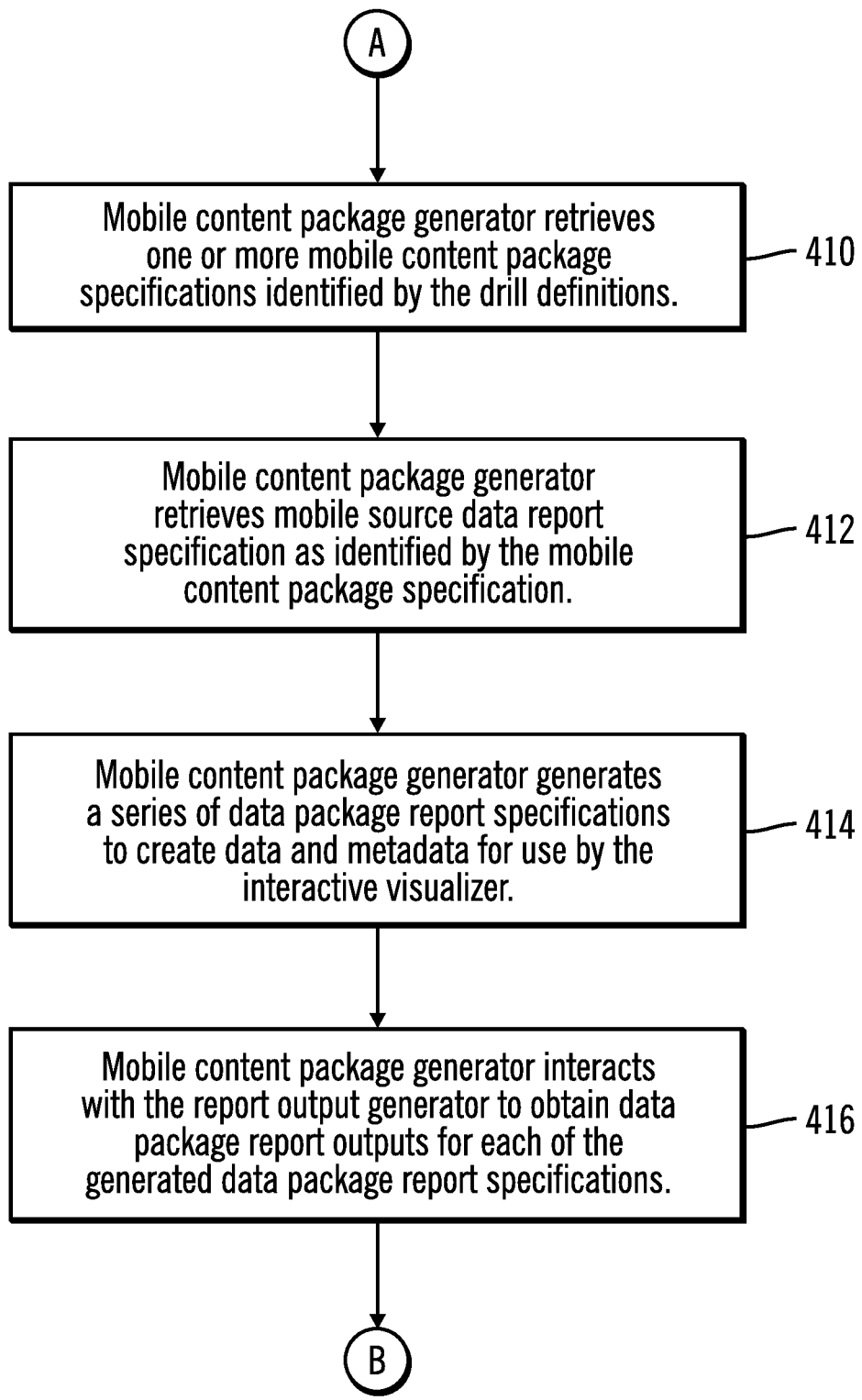

In block 408, the mobile content package generator 110 parses the report specification 150 and detects the presence of drill definitions referring to the interactive visualizer 174. From block 408, processing continues to block 410 (FIG. 4B).

Figure 7:
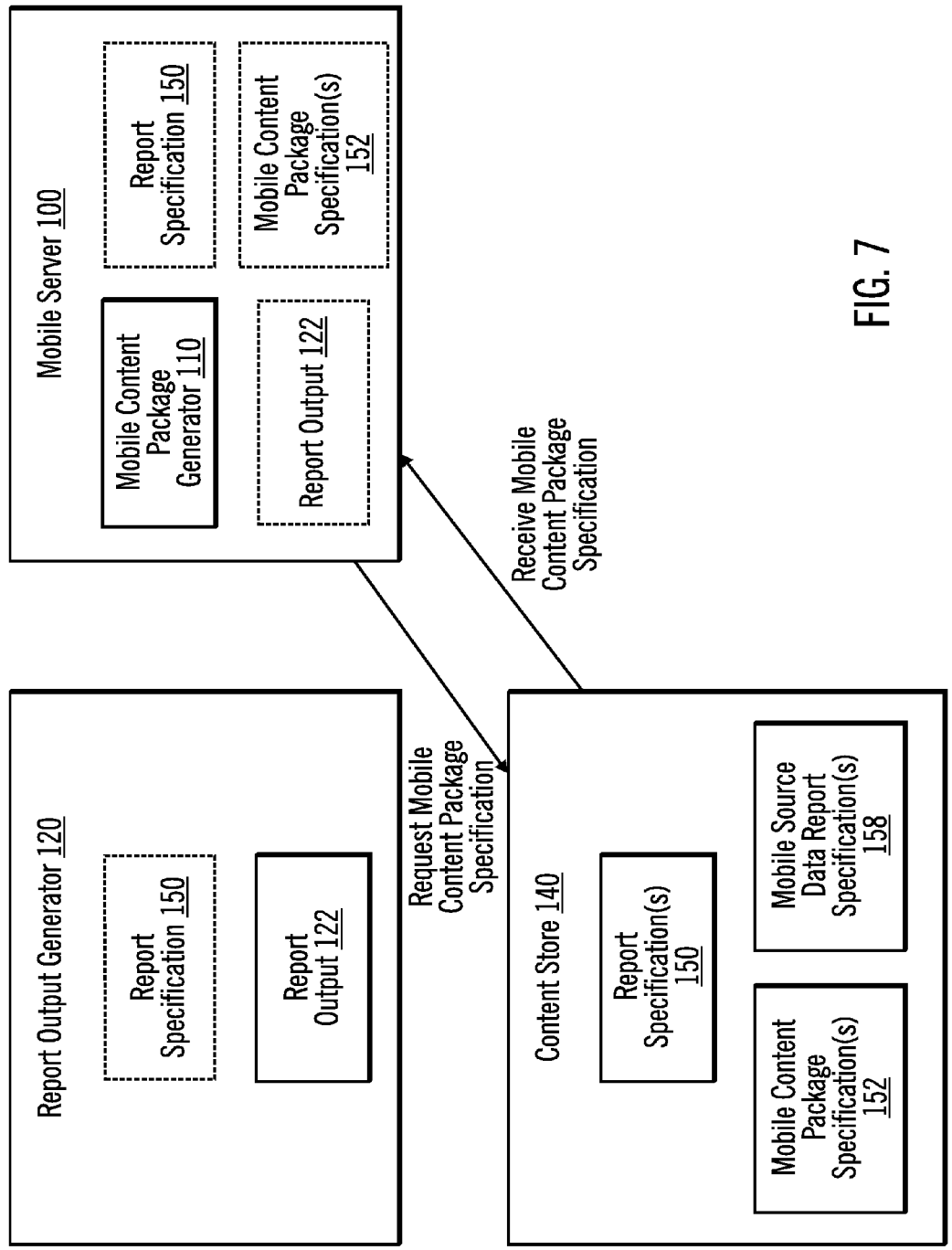
FIG. 7 illustrates, in a block diagram, a mobile content package generator requesting a mobile content package specification from the content store and receiving the mobile content package specification from the content store in accordance with certain embodiments.

In block 410, the mobile content package generator 110 retrieves one or more mobile content package specifications 152 identified by the drill definitions. FIG. 7 illustrates, in a block diagram, the mobile content package generator 110 requesting the mobile content package specification 152 from the content store 140 and receiving the mobile content package specification 152 from the content store 140 in accordance with certain embodiments.

Figure 8:
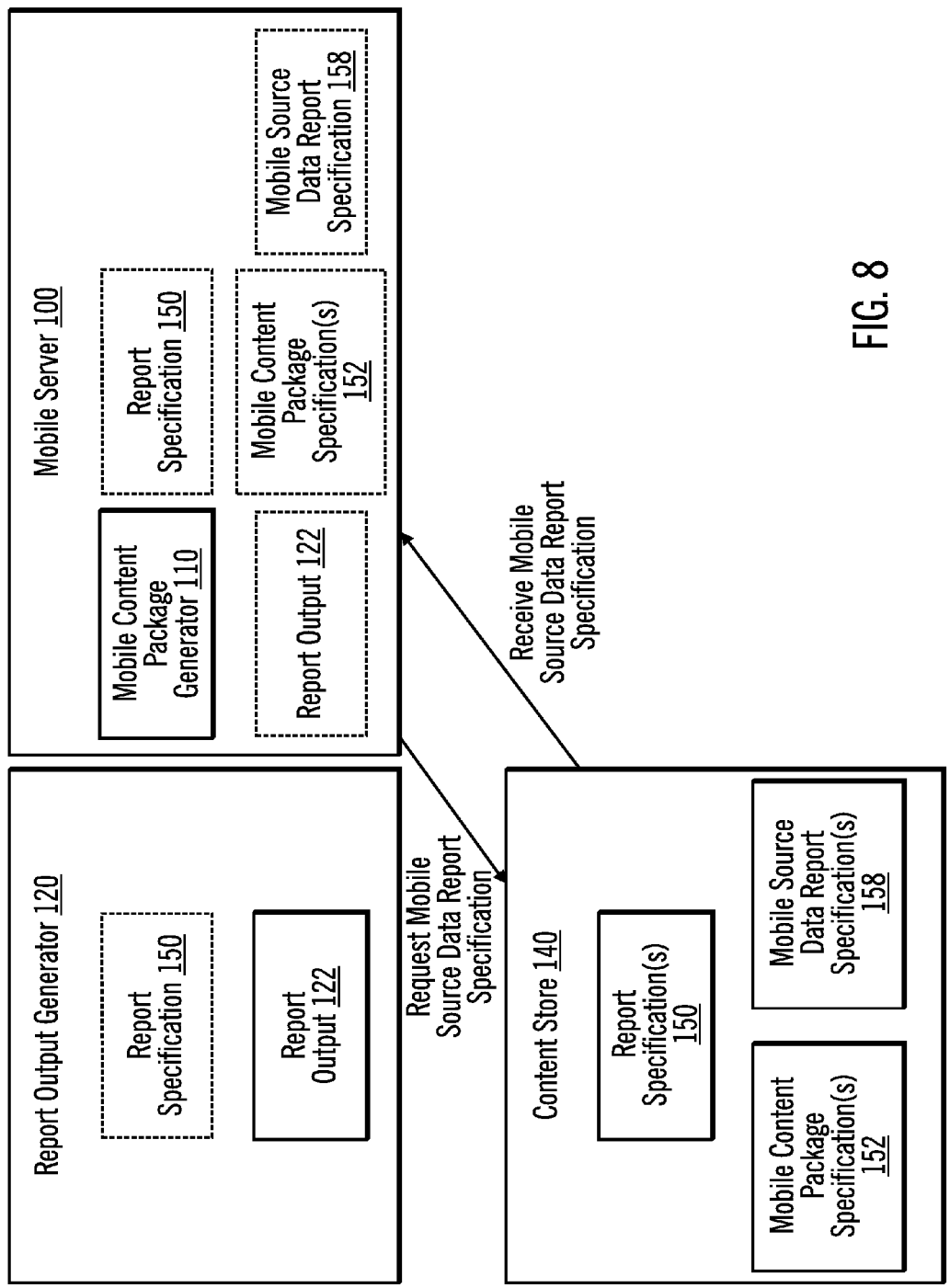
FIG. 8 illustrates, in a block diagram, a mobile content package generator requesting a mobile source data report specification from the content store and receiving the mobile source data report specification from the content store in accordance with certain embodiments.

In block 412, the mobile content package generator 110 retrieves the mobile source data report specification 158 as identified by the mobile content package specification 152. FIG. 8 illustrates, in a block diagram, the mobile content package generator 110 requesting the mobile source data report specification 158 from the content store 140 and receiving mobile source data report specification 158 from the content store 140 in accordance with certain embodiments.

Figure 4C:
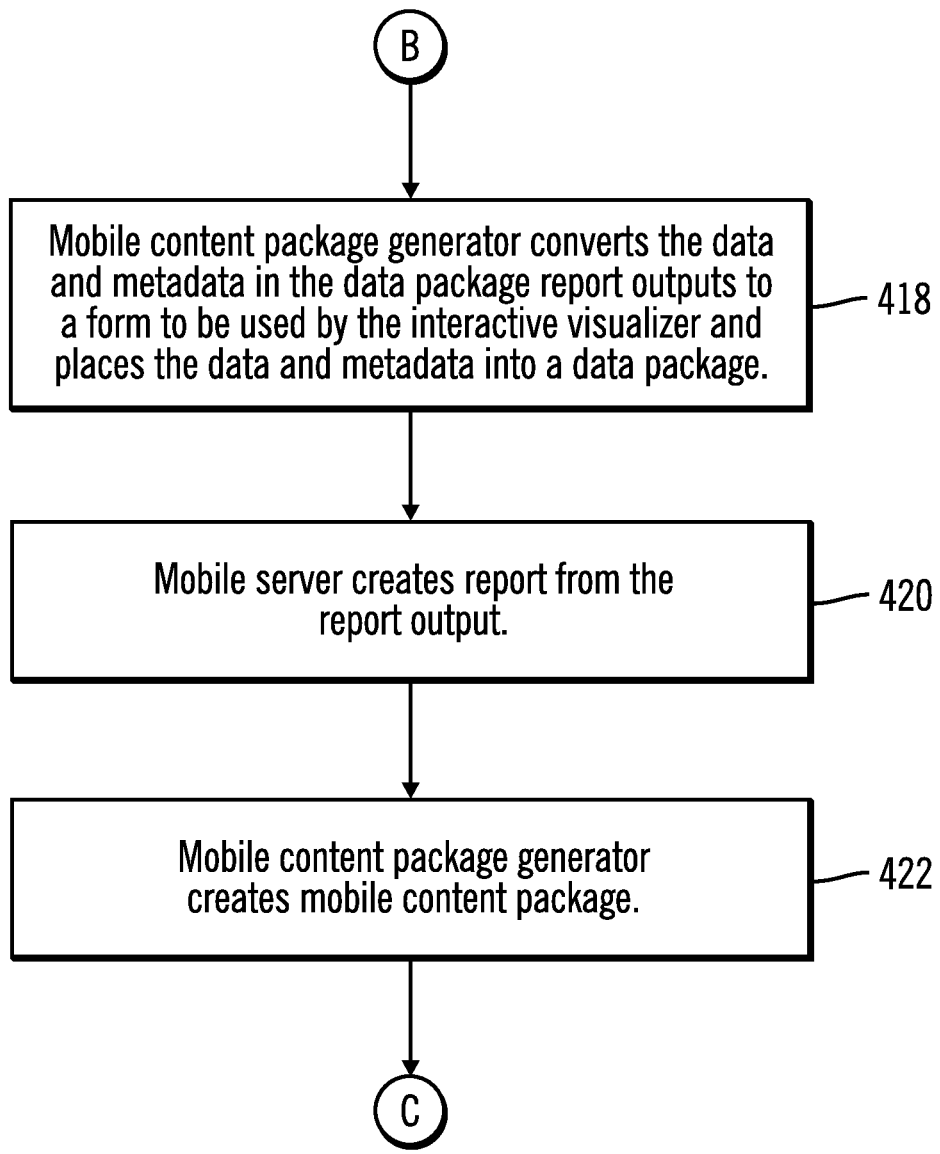
Figure 9:
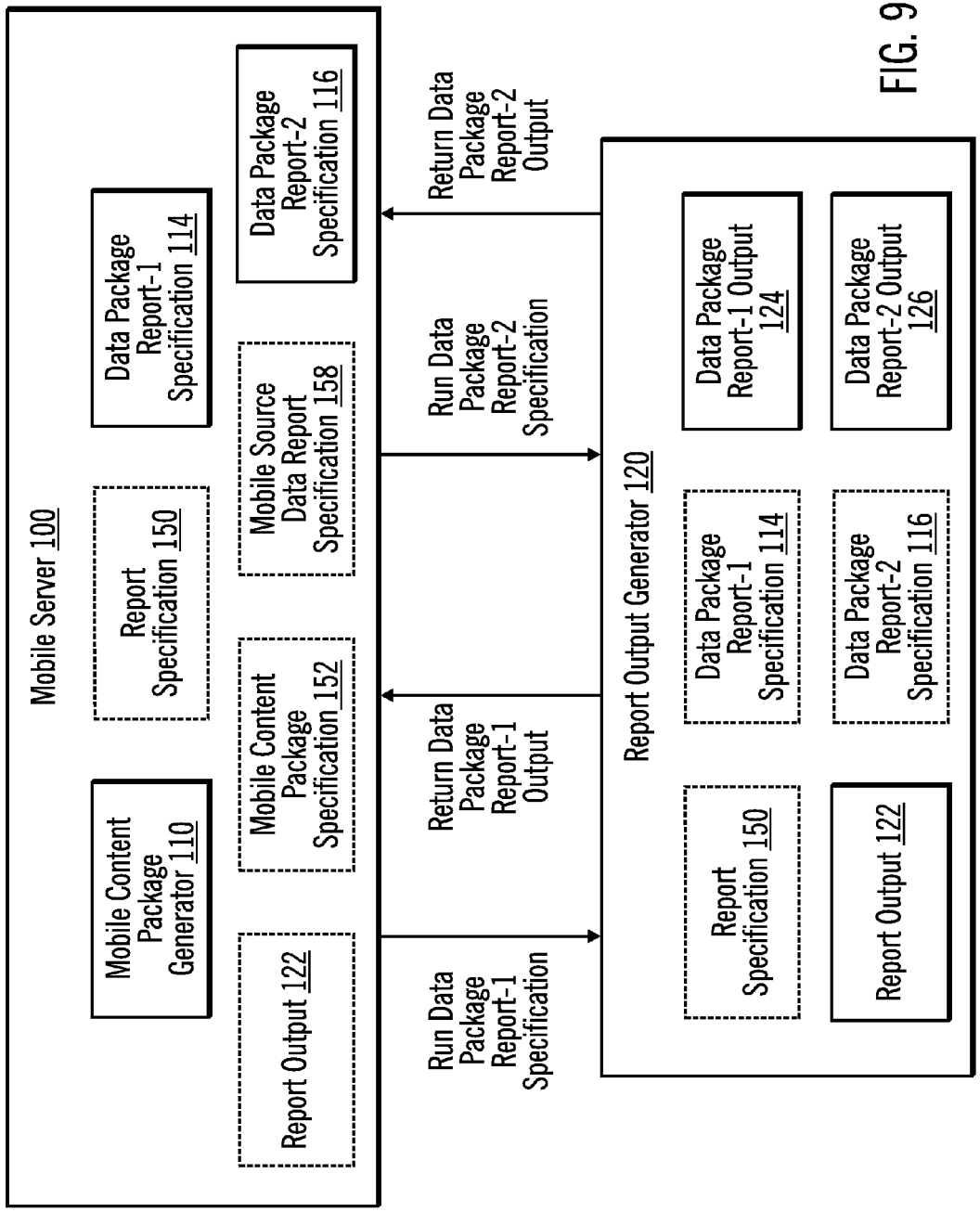
FIG. 9 illustrates, in a block diagram, a mobile content package generator obtaining data package report outputs in accordance with certain embodiments.

In block 414, the mobile content package generator 110 generates a series of data package report specifications 112 to create data and metadata for use by the interactive visualizer 174. In block 416, the mobile content package generator 110 interacts with the report output generator 120 to obtain the data package report outputs 128 for each of the generated data package report specifications 112. From block 416, processing continues to block 418 (FIG. 4C). FIG. 9 illustrates, in a block diagram, the mobile content package generator 110 obtaining data package report outputs in accordance with certain embodiments. In particular, in FIG. 9, the mobile content package generator 110 generates a data package report-1 specification 114 and a data package report-2 specification 116 and requests the report output generator 120 to execute the data package report-1 specification 114 and the data package report-2 specification 116. The report output generator 120 executes the data package report-1 specification 114 and the data package report-2 specification 116 to generate a data package report-1 output 124 and a data package report-2 126 output, respectively. The report output generator 120 sends the data package report-1 output 124 and the data package report-2 output 126 to the mobile content package generator 110.

In block 418, the mobile content package generator 110 converts the data and metadata in the data package report outputs 128 to a form to be used by (e.g., desired by) the interactive visualizer 174 and places the data and metadata into a data package 186.

In block 420, the mobile server 100 creates the report 180 from the report output 122. In certain embodiments, the report 180 may be the same as the report output 122. In certain embodiments, the report 180 is an optimized version of the report output 122 (e.g., which may load faster on the mobile device 160).

Figure 4D:
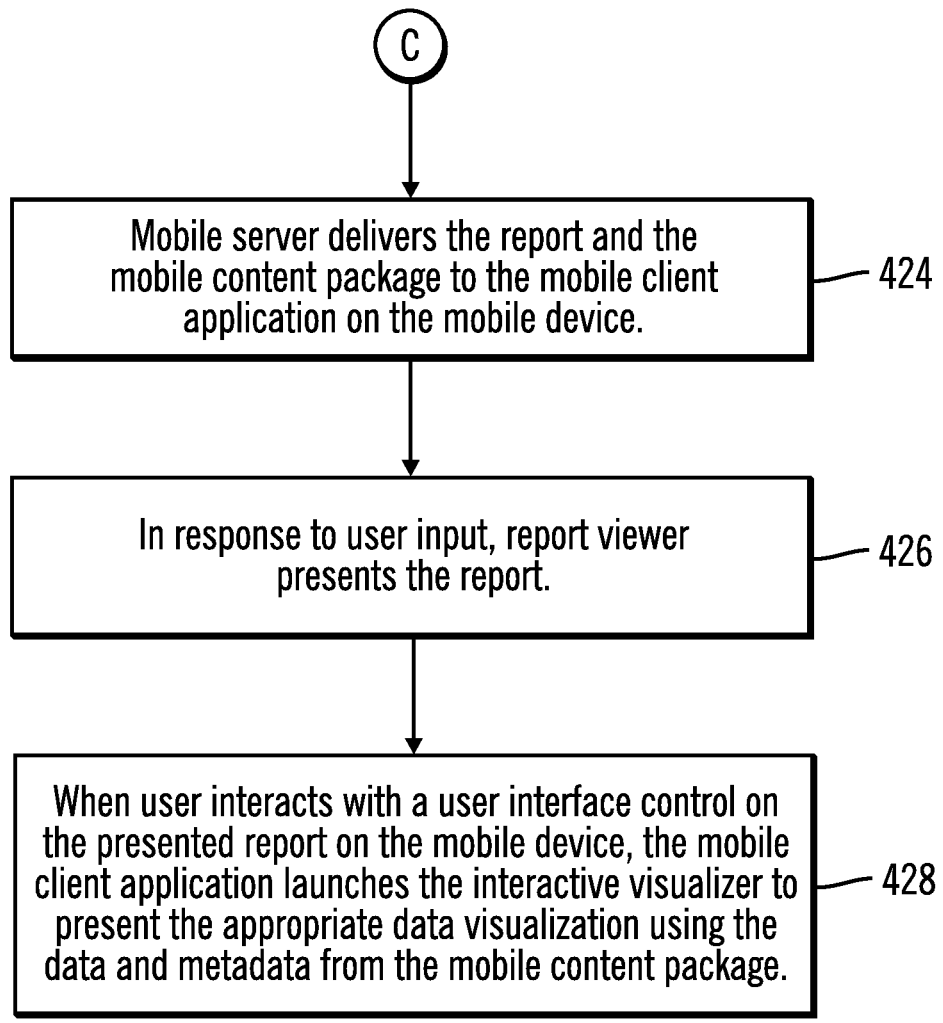

In block 422, the mobile content package generator 110 creates the mobile content package 182. In certain embodiments, the mobile content package generator 110 creates the mobile content package 182 by extracting the visualization specification 154 from the mobile content package specification 152 to form the visualization specification 184 and combining that visualization specification 184 with the data package 186. From block 422, processing continues to block 424 (FIG. 4D).

In block 424, the mobile server 100 delivers the report 180 and the mobile content package 182 to the mobile client application 170 on the mobile device 160. In certain embodiments, the mobile server 100 delivers the report 180 and the mobile content package 182 to the mobile device 160 as a single package.

In block 426, in response to user input, the report viewer 172 presents the report 180. In block 428, when a user interacts with a user interface control (such as a link or menu) on the presented report 180 (e.g., on a displayed web page) on the mobile device 160, the mobile client application 170 launches the interactive visualizer 174 to present the appropriate data visualization using the data and metadata from the mobile content package 182.

Figure 10:
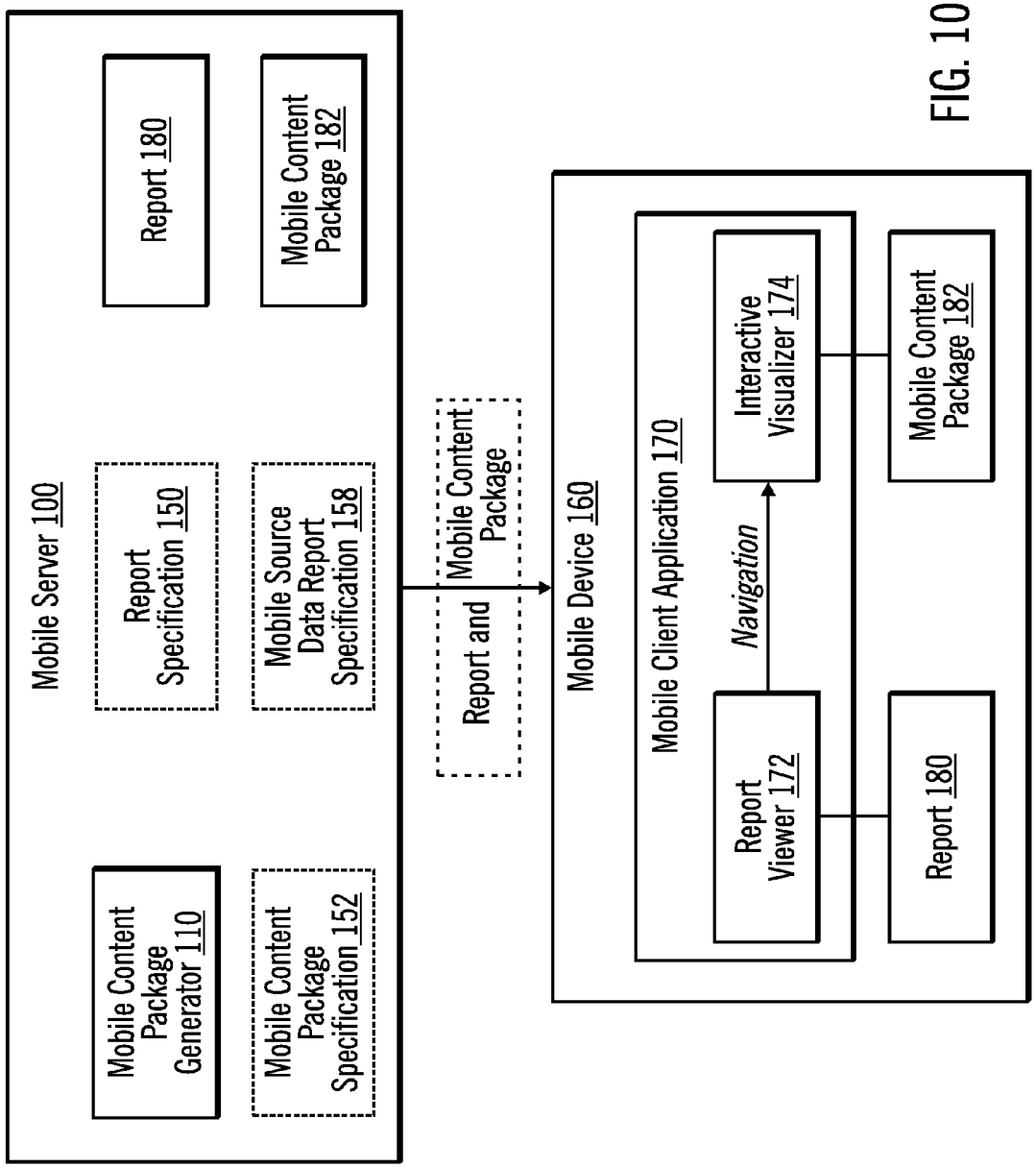
FIG. 10 illustrates, in a block diagram, interaction of a mobile server and a mobile device in accordance with certain embodiments.

FIG. 10 illustrates, in a block diagram, interaction of the mobile server 100 and the mobile device 160 in accordance with certain embodiments. In FIG. 10, the mobile server 100 sends the report 180 and the mobile content package 182 (including the data and metadata) to the mobile client application 170. The report viewer 172 of the mobile client application 170 presents the report 180, and the interactive visualizer 174 uses the mobile content package 182 to present a data visualization (e.g., a graph, chart, cross tabulations, etc.).

An MHT format represents a Multipurpose Internet Mail Extension (MIME) HTML (referred to as MHTML) format. In certain embodiments, the report 180 is in an MHT format, and the report viewer 172 is an MHT report viewer. In certain embodiments, the mobile content package 182 is implemented as a Structured Query Language (SQL) database. The mobile content package 182 may be eXtensible Markup Language (XML) files with meta content, such as error and version information. The MHT report may be decorated enough to understand what mobile content package 182 it is drilling to.

Embodiments allow users to move from data visualizations (such as a graph, chart, cross tabulations, etc.) on a web page to visualizations rendered using platform specific Application Programming Interfaces (APIs) based on the off-line content with a consistent experience. With embodiments, using a single report output generator 120 results in data consistency for data computations, such as aggregation or forecasting.

Embodiments allow the data taken from databases by the report output generator 120 to be connected to web pages and then delivered to the mobile device 160. Embodiments provide cross-application data synchronization.

Embodiments integrate client application processing of a database of data (derived from the report output generator) to show native data visualizations on a mobile device 160 and where both the delivered database and web pages are synchronized.

Embodiments keep an extracted database synchronized with a family of web pages for off-line consumption.

Embodiments use an authored report specification 150 to generate related artifacts on the mobile server 100 at one time so that a consistent/synchronized package of data is sent to the mobile device 160 and can be used without subsequent conversation with the mobile server 100.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIG. 2 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Figure 11:
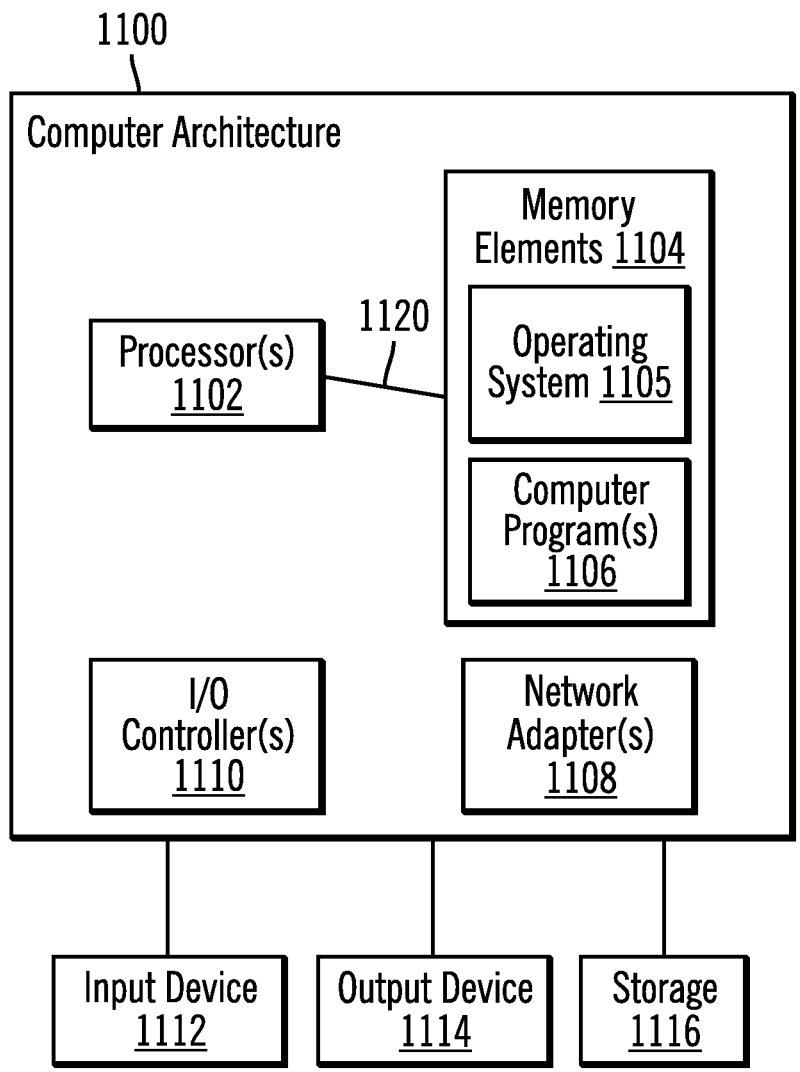
FIG. 11 illustrates, in a block diagram, a computer architecture that may be used in accordance with certain embodiments.

FIG. 11 illustrates a computer architecture 1100 that may be used in accordance with certain embodiments. The mobile server 100, the report output generator 120, and/or the mobile device 160 may implement computer architecture 1100. The computer architecture 1100 is suitable for storing and/or executing program code and includes at least one processor 1102 coupled directly or indirectly to memory elements 1104 through a system bus 1120. The memory elements 1104 may include local memory employed during actual execution of the program code, bulk storage, and cache memories which provide temporary storage of at least some program code in order to reduce the number of times code must be retrieved from bulk storage during execution. The memory elements 1104 include an operating system 1105 and one or more computer programs 1106.

Input/Output (I/O) devices 1112, 1114 (including but not limited to keyboards, displays, pointing devices, etc.) may be coupled to the system either directly or through intervening I/O controllers 1110.

Network adapters 1108 may also be coupled to the system to enable the data processing system to become coupled to other data processing systems or remote printers or storage devices through intervening private or public networks. Modems, cable modem and Ethernet cards are just a few of the currently available types of network adapters 1108.

The computer architecture 1100 may be coupled to storage 1116 (e.g., any type of storage device; a non-volatile storage area, such as magnetic disk drives, optical disk drives, a tape drive, etc.). The storage 1116 may comprise an internal storage device or an attached or network accessible storage. Computer programs 1106 in storage 1116 may be loaded into the memory elements 1104 and executed by a processor 1102 in a manner known in the art.

The computer architecture 1100 may include fewer components than illustrated, additional components not illustrated herein, or some combination of the components illustrated and additional components. The computer architecture 1100 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method for presenting a data visualization on an off-line mobile device, comprising:
 parsing, using a processor of a computer, a report specification to detect a drill definition to navigate from a report viewer that is an off-line web browser for presenting a report that comprises one or more off-line web pages to an interactive visualizer that is a different viewer for presenting the data visualization based on data and metadata stored locally in an off-line database and that is a separate data visualization environment, wherein the parsing comprises converting a drill through element to a Uniform Resource Locator (URL) link that is to be interpreted as a link to the interactive visualizer;
 generating data package report specifications to create data and metadata for use by the interactive visualizer;
 executing the data package report specifications to create data package report outputs;
 converting data and metadata in each of the data package report outputs to a form that is optimized for the data visualization;
 storing the converted data and metadata into a data package;
 creating a mobile content package by extracting, from a mobile content package specification identified by the drill definition, a visualization specification that describes visualization properties of presentation layout for displaying the data visualization and combining the visualization specification with the data package;
 delivering the report and the mobile content package to the off-line mobile device;
 intercepting the URL link used by the user in the report viewer that presents the report;
 in response to intercepting the URL link, determining a course of action;
 in response to determining that the course of action indicates navigation to the interactive visualizer, launching the interactive visualizer to present the data visualization using the mobile content package at the off-line mobile device; and
 in response to determining that the course of action indicates drilling to another report, drilling to the another report representing another one or more web pages.

2. The method of claim 1, further comprising:
 navigating from the interactive visualizer to the report viewer.

3. The method of claim 1, further comprising:
 using data from the report presented by the report viewer as one or more parameters for the data visualization presented by the interactive visualizer.

4. The method of claim 1, further comprising:
 executing the report specification to create report output; and
 creating the report from the report output.

5. The method of claim 1, wherein the data package report specifications are based on one or more mobile source data report specifications.

6. The method of claim 1, wherein the presented report and the presented data visualization are synchronized.

7. A computer program product for presenting a data visualization on an off-line mobile device, the computer program product comprising:
 a non-transitory computer readable storage medium having computer readable program code embodied therein, the computer readable program code, when executed by a processor of a computer, is configured to perform:
 parsing a report specification to detect a drill definition to navigate from a report viewer that is an off-line web browser for presenting a report that comprises one or more off-line web pages to an interactive visualizer that is a different viewer for presenting the data visualization based on data and metadata stored locally in an off-line database and that is a separate data visualization environment, wherein the parsing comprises converting a drill through element to a Uniform Resource Locator (URL) link that is to be interpreted as a link to the interactive visualizer;
 generating data package report specifications to create data and metadata for use by the interactive visualizer;
 executing the data package report specifications to create data package report outputs;
 converting data and metadata in each of the data package report outputs to a form that is optimized for the data visualization;
 storing the converted data and metadata into a data package;
 creating a mobile content package by extracting, from a mobile content package specification identified by the drill definition, a visualization specification that describes visualization properties of presentation layout for displaying the data visualization and combining the visualization specification with the data package;

delivering the report and the mobile content package to the off-line mobile device;

intercepting the URL link used by the user in the report viewer that presents the report;

in response to intercepting the URL link, determining a course of action;

in response to determining that the course of action indicates navigation to the interactive visualizer, launching the interactive visualizer to present the data visualization using the mobile content package at the off-line mobile device; and in response to determining that the course of action indicates drilling to another report, drilling to the another report representing another one or more web pages.

8. The computer program product of claim 7, further comprising: navigating from the interactive visualizer to the report viewer.

9. The computer program product of claim 7, wherein the computer readable program code, when executed by the processor of the computer, configured to perform:

using data from the report presented by the report viewer as one or more parameters for the data visualization presented by the interactive visualizer.

10. The computer program product of claim 7, wherein the computer readable program code, when executed by the processor of the computer, configured to perform:

executing the report specification to create report output; and creating the report from the report output.

11. The computer program product of claim 7, wherein the data package report specifications are based on one or more mobile source data report specifications.

12. The computer program product of claim 7, wherein the presented report and the presented data visualization are synchronized.

13. A computer system for presenting a data visualization on an off-line mobile device, comprising:

a processor; and a storage device coupled to the processor, wherein the storage device has stored thereon a program, and wherein the processor is configured to execute instructions of the program to perform operations, wherein the operations comprise:

parsing a report specification to detect a drill definition to navigate from a report viewer that is an off-line web browser for presenting a report that comprises one or more off-line web pages to an interactive visualizer that is a different viewer for presenting the data visualization based on data and metadata stored locally in an off-line database and that is a separate data visualization environment, wherein the parsing comprises converting a drill through element to a Uniform Resource Locator (URL) link that is to be interpreted as a link to the interactive visualizer;

generating data package report specifications to create data and metadata for use by the interactive visualizer;

executing the data package report specifications to create data package report outputs;

converting data and metadata in each of the data package report outputs to a form that is optimized for the data visualization;

storing the converted data and metadata into a data package;

creating a mobile content package by extracting, from a mobile content package specification identified by the drill definition, a visualization specification that describes visualization properties of presentation layout for displaying the data visualization and combining the visualization specification with the data package;

delivering the report and the mobile content package to the off-line mobile device;

intercepting the URL link used by the user in the report viewer that presents the report;

in response to intercepting the URL link, determining a course of action;

in response to determining that the course of action indicates navigation to the interactive visualizer, launching the interactive visualizer to present the data visualization using the mobile content package at the off-line mobile device; and in response to determining that the course of action indicates drilling to another report, drilling to the another report representing another one or more web pages.

14. The computer program product of claim 13, further comprising:

navigating from the interactive visualizer to the report viewer.

15. The computer system of claim 13, wherein the operations further comprise:

using data from the report presented by the report viewer as one or more parameters for the data visualization presented by the interactive visualizer.

16. The computer system of claim 13, wherein the operations further comprise:

executing the report specification to create report output; and creating the report from the report output.

17. The computer system of claim 13, wherein the data package report specifications are based on one or more mobile source data report specifications.

18. The computer system of claim 13, wherein the presented report and the presented data visualization are synchronized.

* * * * *